Figure 1:
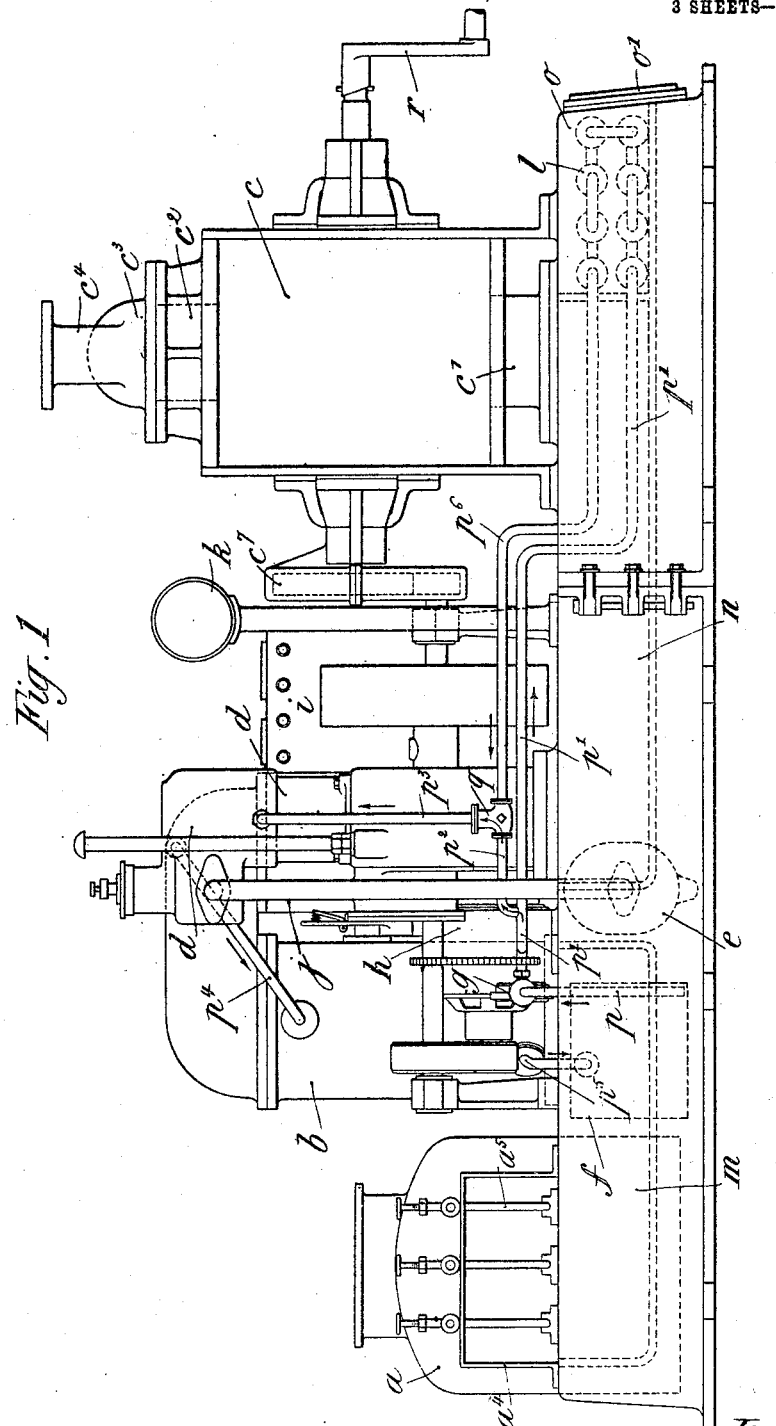

No. 799,348. PATENTED SEPT. 12, 1905.
R. MAROT.
APPARATUS FOR THE PRODUCTION AND DISTRIBUTION OF GASEOUS MIXTURE
FOR EXTINGUISHING FIRE, KILLING INSECTS, &c.
APPLICATION FILED MAY 23, 1905.

3 SHEETS—SHEET 1.

No. 799,348. PATENTED SEPT. 12, 1905.
R. MAROT.
APPARATUS FOR THE PRODUCTION AND DISTRIBUTION OF GASEOUS MIXTURE
FOR EXTINGUISHING FIRE, KILLING INSECTS, &c.
APPLICATION FILED MAY 23, 1905.

3 SHEETS—SHEET 2.

Witnesses:
Henry Thieme.
F. George Barry.

Inventor:-
René Marot
by attorneys

No. 799,348. PATENTED SEPT. 12, 1905.
R. MAROT.
APPARATUS FOR THE PRODUCTION AND DISTRIBUTION OF GASEOUS MIXTURE
FOR EXTINGUISHING FIRE, KILLING INSECTS, &c.
APPLICATION FILED MAY 23, 1905.
3 SHEETS—SHEET 3.
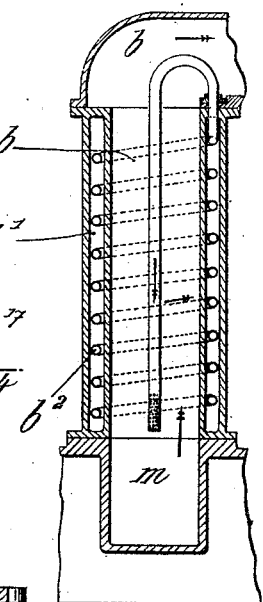
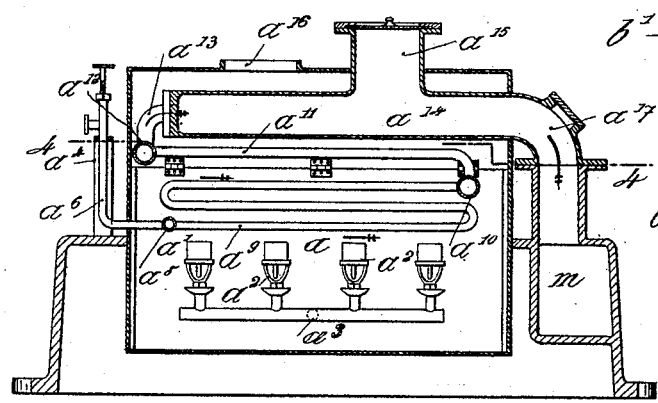
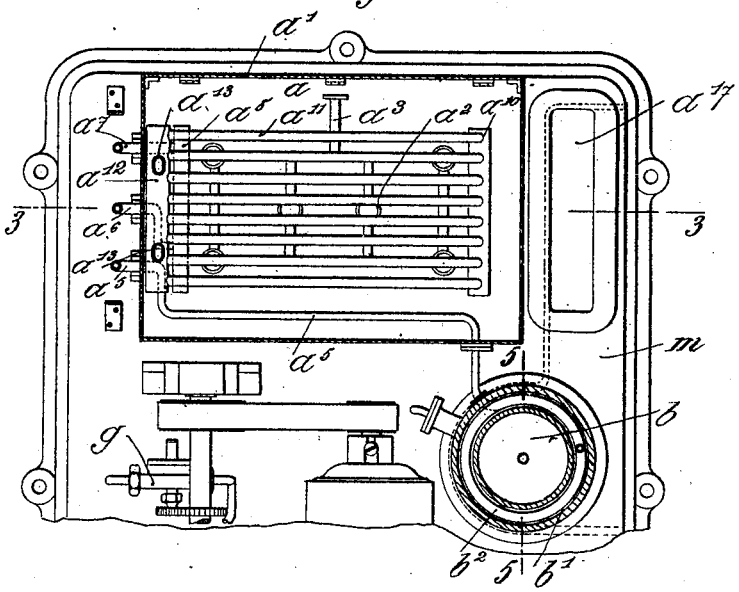
Witnesses:
Henry Thieme.
F. George Barry.
Inventor
René Marot
by attorneys
Brown & Seward

UNITED STATES PATENT OFFICE.

RENÉ MAROT, OF PARIS, FRANCE.

APPARATUS FOR THE PRODUCTION AND DISTRIBUTION OF GASEOUS MIXTURE FOR EXTINGUISHING FIRE, KILLING INSECTS, &c.

No. 799,348.      Specification of Letters Patent.      Patented Sept. 12, 1905.

Application filed May 23, 1905. Serial No. 261,802.

*To all whom it may concern:*

Be it known that I, RENÉ MAROT, engineer, a citizen of the Republic of France, and a resident of 252 Rue Lecourbe, Paris, in the Republic of France, have invented a new and useful Apparatus for the Production and Distribution of a Gaseous Mixture Serving for the Extinguishing of Fire and for Killing Insects and Microbes, of which the following is a specification.

This invention relates to improvements in apparatus for the production and distribution of a gaseous mixture serving for extinguishing fire and for killing insects and microbes.

The improvements consist, mainly, in arrangements for enabling the rapid production to be effected of a large quantity of the said gaseous mixture by means of liquid sulfurous anhydrid (sulfur dioxid) contained in bottles such as are obtained in commerce, which gaseous mixture is then conveyed into localities where it is required to operate, the cold produced by the vaporization of the sulfurous anhydrid being counteracted by means of the heat contained in the water which has served to cool the internal-combustion motor employed for driving the dynamo and the propelling-fan required in the process, the heat of the combustion-gases from the motor being also applicable for this purpose and an additional supply of heat being provided by a series of Bunsen burners in a special heating-chamber.

The improvements also include an arrangement of heat-radiating apparatus by means of which the cooling-water for the motor is deprived of its heat in the case when the apparatus is not employed for producing and conveying the gaseous mixture, but is only used for reaspirating such mixture from the locality where it is employed, in which case there is no cold produced by the vaporization of the anhydrid which is available for the said purpose.

The improvements also include means for regulating the proportion of air contained in the gaseous mixture and the temperature of the latter both at its issue from the apparatus and during its passage through the same, and more particularly at the time when it passes through the chamber in which it is subject to the action of silent electric discharges and electric sparks, which action has its maximum of efficiency when the gaseous mixture operated upon thereby contains suitable proportions of air and sulfurous anhydrid.

I will describe the construction of apparatus for carrying out the said several improvements with reference to the accompanying drawings, in which—

Figure 2:
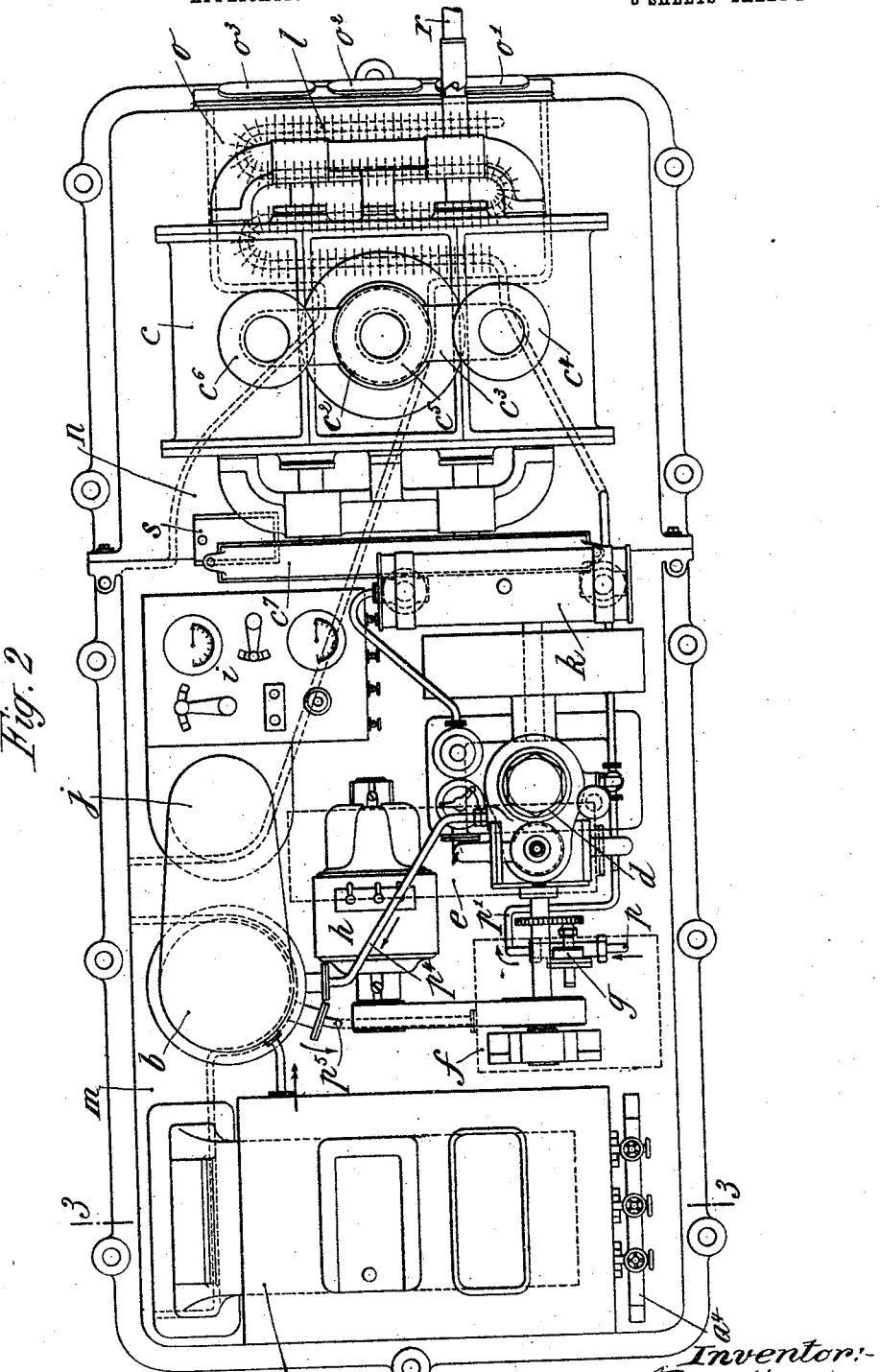

Figure 1 shows a side elevation of the improved apparatus. Fig. 2 shows a plan. Fig. 3 is a transverse section of the heater on the line 3 3, Figs. 2 and 4. Fig. 4 is a horizontal section of the heater and of the water-cooler on the line 4 4 of Fig. 3. Fig. 5 is a vertical section of the water-cooler on line 5 5 of Fig. 4.

On the drawings, $a$ is the heater of sulfurous anhydrid, the apparatus being supposed to be fed by three bottles of liquid anhydrid, which are emptied simultaneously.

$b$ is the water-cooler—*i. e.*, the receptacle in which the cooling-water of the motor gives up its heat to the sulfurous anhydrid when the apparatus is employed for producing and injecting a gaseous mixture.

$c$ is the fan, preferably of the Roots blower kind, which serves either for drawing through the apparatus the gaseous mixture formed by means of the liquid sulfurous anhydrid and to force it into the locality where it is to operate, or it may be employed to draw the mixture out of such locality and to discharge it either into the atmosphere or into any other locality.

$d$ is the motor working with petrol, alcohol, &c., and serving to drive the fan or blower, as also the pump $g$ and the dynamo $h$. $e$ is the exhaust-chamber of the motor.

$f$ is the reservoir containing the cooling-water.

$g$ is the pump, preferably a rotary pump, of the kind with toothed drums, which serves to effect the circulation of the cooling-water.

$h$ is the dynamo producing the electric current which is sent into the primary winding of the induction-coil by means of which the silent electric discharges and the electric sparks which serve to partially transform the mixture of sulfurous anhydrid and air into sulfuric anhydrid and ozone.

$i$ is the casing containing the induction-coil and the measuring apparatus.

$j$ is the cylindrical chamber of glass in which the silent electric discharges and the electric sparks take place and which is traversed by the mixture of air and sulfurous anhydrid.

This chamber is arranged in a vertical position, as shown.

$k$ is the reservoir of petrol, &c., for feeding the motor.

$l$ is the radiator in which the water for the motor is made to circulate only when the apparatus serves to effect a reaspiration, and consequently when the sulfurous anhydrid is not vaporized.

The heater $a$ is composed of a sheet-iron casing partly contained in the base of the apparatus and provided with an opening panel $a'$. In its lower part are arranged Bunsen burners $a^2$, supplied, by preference, with petrol fed under pressure through a flexible pipe attached to the tube $a^3$, Fig. 4. The burners might also be arranged outside the casing $a$, so that their flames are projected horizontally into the casing. In this case is arranged a system of pipes through which the sulfurous anhydrid circulates in order to become heated. The three bottles of liquid anhydrid under pressure are put in communication, respectively, with three tubes $a^5 a^6 a^7$, connected to the said system of pipes, which pass out at one end of the chamber $a$, rise vertically, and are held by a bracket $a^4$, through which they pass, each tube being provided with a cock with pin-plug. One of these three tubes, $a^5$ only, has three superposed bends and issues laterally from the casing $a$ for leading the sulfurous anhydrid directly into the water-cooler $b$ without causing it to pass through the mixing-chamber to be presently described. The other two, $a^6$ and $a^7$, open into a collector $a^8$, which is connected by three serpentine tubes $a^9$ to a second collector $a^{10}$, connected in its turn by tubes $a^{11}$ to a third collector $a^{12}$, connected by two tubes $a^{13}$ to a mixing-chamber $a^{14}$, which thus receives sulfurous anhydrid supplied by two of the bottles, together with a supply of air entering through an upper inlet $a^{15}$, which is provided with a regulating-valve, which air is mixed with the gas and is drawn off, together with the same, by the action of the fan. An opening $a^{16}$, provided in the top of the heater $a$, serves for the escape of the combustion-gases. The mixture, already heated by the heat given off by the Bunsen burners, issues from the chamber $a^{14}$ through a branch pipe $a^{17}$, attached to a conduit $m$, formed in the base of the apparatus and communicating with the central part of the air-cooler $b$, Fig. 5. Round the central part is formed an annular space $b'$, through which circulates the cooling-water of the motor and which contains a helically-coiled pipe $b^2$, which is connected at the lower end to the before-mentioned tube $a^5$. At the upper end this coiled tube is bent downward, so as to descend through the center of the water-cooler, and its lower closed end is perforated for allowing the escape of the sulfurous anhydrid which has circulated through the same— namely, that coming from the first bottle which is not mixed with air and which there mixes with the mixture of anhydrid and air coming from the mixing-chamber $a^{14}$. This gaseous mixture after having been again heated in the apparatus $b$ in taking up the heat from the motor-cooling water passes through the hood of $b$ into the chamber $j$, through which it passes in a downward direction and where it is subject to the action of silent electric discharges and of electric sparks. A conduit $n$, formed in the base of the apparatus, then leads the gaseous mixture to the inlet-orifice $c'$ of the suction-fan $c$. An opening formed in the top of this conduit and regulatable by a slide $s$ allows of the introduction of a fresh quantity of air into the mixture before entering the fan. The mixture is forced through the upper orifice $c^2$ of the fan, to which is preferably fixed a piece $c^3$, having three branch openings $c^4 c^5 c^6$, in order to enable the gaseous mixture to be propelled simultaneously through three pipes communicating at different points with the locality where the gaseous mixture is to operate.

The motor actuates the fan by means of a speed-reducing train of wheels inclosed in a casing $c^7$. Below the fan there is formed in the base a space $o$, having at the end three orifices to which are adapted pipes when it is desired to reaspirate the gaseous mixture and which when this is not the case are closed by covers $o'$, $o^2$, and $o^3$. In this space is arranged the radiator $l$, which is constituted by serpentine ribbed pipes through which circulates the cooling-water of the motor, so that when the reaspirating action is employed there takes place an exchange of temperature between this water and the current of cold gaseous mixture drawn in by the fan. In this case the cooling-water is drawn by the pump $g$ from the reservoir $f$ and sent through the radiator $l$ in order to be cooled, after which the water passes to the motor $d$ and thence to the cooler $b$ (which in this case has no action, as it is not supplied with sulfurous anhydrid) and whence it returns finally to the reservoir $f$. When there is no action by reaspiration of the gaseous mixture, but the production of the latter and the forcing thereof into the locality where it is to operate, the circulation of the water is the same, with the exception that it passes directly from the pump to the motor without passing through the radiator. This circulation is effected by a system of pipes including a pipe $p$, by means of which the pump draws the water from the reservoir, a pipe $p'$, passing from the discharge of the pump to the radiator, a pipe $p^2$, branched upon $p'$ and passing to a three-way cock $q$, a pipe $p^3$, passing from the cock $q$ to the motor, a pipe $p^4$, connecting the latter with the upper part of the annular space of the cooler, a pipe $p^5$, passing from the bottom of such space to the reservoir, and, lastly, a pipe $p^6$, coming from the radiator and passing to the three-way cock $q$. It will be understood that by turning the three-way cock $q$ into one position, the water will pass directly from the pump to the motor in arriving at the cock through the branch $p^2$ and without circulating through $p'$ beyond this branch, nor through the pipe $p^6$, while by another position of the cock the water may be made to pass through the whole length of $p'$, through the radiator, returning by the pipe $p^6$ to the cock $q$, and thence to the motor.

The motor, besides driving the fan in the manner described, drives the dynamo by a belt and pulley and the pump by chain gear.

The shaft of the fan may be provided with a crank-handle $r$ for starting it.

Having thus described my invention, what I claim is—

1. In apparatus for the production and distribution of a gaseous mixture of sulfurous anhydrid and air adapted to extinguish fire and to kill insects and microbes, the combination of a heating-chamber in which the anhydrid is heated by an extraneous source of heat, a mixing-chamber in which a portion of the heated anhydrid is vaporized and mixed with air; a motor, a chamber for cooling the water for the motor, into which said gaseous mixture passes from the mixing-chamber and into which is also led a portion of the heated liquid anhydrid not mixed with air, a chamber in which electric discharges and sparks take place, into which said gaseous mixture is led from the said water-cooler, and a fan adapted to draw said gaseous mixture from said electric discharge and spark chamber and to propel it to wherever required, substantially as described.

2. In apparatus for the production and distribution of a gaseous mixture of sulfurous anhydrid and air adapted to extinguish fire and to kill insects and microbes, the combination of a heating-chamber in which the anhydrid is heated by an extraneous source of heat, a mixing-chamber in which a portion of the heated anhydrid is vaporized and mixed with air, a motor, a chamber for cooling the water for the motor, into which said gaseous mixture passes from the mixing-chamber and into which is also led a portion of the heated liquid anhydrid not mixed with air, a chamber in which electric discharges and sparks take place, into which said gaseous mixture is led from the said water-cooler, and a fan adapted to draw said gaseous mixture from said electric discharge and spark chamber and to propel it to wherever required, and means for adding a regulatable quantity of air to said gaseous mixture on its way from the electric discharge and spark chamber and the fan, substantially as described.

3. In apparatus for the production and distribution of a gaseous mixture of sulfurous anhydrid and air adapted to extinguish fire and to kill insects and microbes, the combination of a heating-chamber in which the anhydrid is heated by an extraneous source of heat, a mixing-chamber in which a portion of the heated anhydrid is vaporized and mixed with air, a motor, a chamber for cooling the water for the motor, into which said gaseous mixture passes from the mixing-chamber and into which is also led a portion of the heated liquid anhydrid not mixed with air, a pump for supplying cooling-water to the motor driving the apparatus, a three-way cock on the discharge of said pump, a tubular heat-radiating apparatus, pipe means connecting said three-way cock with said heat-radiator and with said water-cooler, and adapted to convey the water from the pump either directly to the motor or first through the radiator and then to the motor, a chamber in which electric discharges and sparks take place, into which said gaseous mixture is led from the said water-cooler, and a fan adapted to draw said gaseous mixture from said electric discharge and spark chamber and to propel it to wherever required, substantially as described.

4. In apparatus for the production and distribution of a gaseous mixture of sulfurous anhydrid and air, the combination of a tubular heating apparatus for heating the anhydrid by means of Bunsen burners, a mixing-chamber into which a portion of the heated anhydrid issues and into which a regulatable quantity of air is admitted to mix with the anhydrid, a motor, a chamber for cooling the water for the motor, into which said gaseous mixture passes from the mixing-chamber and into which is also led a portion of the heated liquid anhydrid not mixed with air, a chamber in which electric discharges and sparks take place, into which said gaseous mixture is led from the said water-cooler, and a fan adapted to draw said gaseous mixture from said electric discharge and spark chamber and to propel it to wherever required, substantially as described.

5. In apparatus for the production and distribution of a gaseous mixture of sulfurous anhydrid and air adapted to extinguish fire and to kill insects and microbes, the combination of a heating-chamber in which the anhydrid is heated by an extraneous source of heat, a mixing-chamber in which a portion of the heated and vaporized anhydrid is mixed with air, a motor for driving the apparatus, a device for cooling the water for the motor consisting of an annular receptacle through which circulates the said water and which contains a pipe-coil through which passes a portion of the anhydrid coming from the heater that is not vaporized and not mixed with air, a central chamber in said receptacle into which passes the mixture of vaporized anhydrid and air coming from said mixing-chamber, and into which also the anhydrid passing through said pipe-coil issues and is vaporized, a chamber in which electric discharges and sparks take place, into which said gaseous mixture is led from the said water-cooler, and a fan adapted to draw said gaseous mixture from said electric discharge and spark chamber and to propel it to wherever required, substantially as described.

In testimony that I claim the foregoing as my invention I have signed my name, in presence of two witnesses, this 6th day of May, 1905.

RENÉ MAROT.

Witnesses:
    HANSON C. COXE,
    ALCIDE FABE.